United States Patent [19]

Littlefield

[11] 4,219,452

[45] Aug. 26, 1980

[54] COMPOSITE FRICTION ELEMENT

[75] Inventor: John B. Littlefield, Wheaton, Ill.

[73] Assignee: AMSTED Industries Incorporated, Chicago, Ill.

[21] Appl. No.: 907,830

[22] Filed: May 19, 1978

Related U.S. Application Data

[63] Continuation-in-part of Ser. No. 738,052, Nov. 2, 1976, abandoned.

[51] Int. Cl.$^2$ .................................................. C08K 7/02
[52] U.S. Cl. ..................... 260/3; 188/251 A; 260/38; 260/42.22; 260/42.32; 260/42.35; 260/42.36; 260/42.37; 260/998.13
[58] Field of Search .......... 260/42.32, 857 D, 998.13, 260/3, 38, 42.22, 42.35, 42.36, 42.37, DIG. 39; 188/251 A

[56] References Cited

U.S. PATENT DOCUMENTS

| | | | |
|---|---|---|---|
| 2,599,826 | 6/1952 | Halstead | 260/DIG. 39 |
| 2,861,964 | 11/1958 | De Gaugue et al. | 260/998.13 |
| 3,006,899 | 10/1961 | Hill et al. | 260/78 R |
| 3,817,941 | 6/1974 | Blair | 260/30.6 R |
| 3,885,006 | 5/1975 | Hatch et al. | 260/DIG. 39 |
| 3,959,194 | 5/1976 | Adelmann | 260/998.13 |
| 3,972,394 | 8/1976 | Jacko et al. | 260/DIG. 39 |
| 3,991,027 | 11/1976 | van Gils et al. | 260/857 D |

*Primary Examiner*—James H. Derrington
*Attorney, Agent, or Firm*—John L. Schmitt; Fred P. Kostka; Edward J. Brosius

[57] ABSTRACT

A composite friction element suitable for the manufacture of railroad brake shoes of the composition type is prepared from a mixture of a curable rubber binder having distributed therethrough a plurality of fillers and a reinforcing fiber, at least one of the fillers having an oil absorption value of at least 30 and the fiber being formed from an aramid polymer.

16 Claims, No Drawings

COMPOSITE FRICTION ELEMENT

BACKGROUND OF THE INVENTION

This application is a continuation-in-part copending application Ser. No. 738,052 filed Nov. 2, 1976 now abandoned.

FIELD OF THE INVENTION

The present invention relates to friction elements and more particularly, to composite friction element useful as brake shoes for railroad brakes which element is devoid of asbestos.

THE PRIOR ART

Brake shoes for railroad brakes of the composition type are formed of a composite friction material composed of a rubber binder resin, having distributed therethrough a variety of fillers and a reinforcing fiber such as asbestos. Examples of composite friction elements used in the manufacture of the brake shoes are disclosed in U.S. Pat. Nos. 3,885,006 and 3,959,194.

U.S. Pat. No. 3,885,006 teaches composite friction elements formed of 15-35% by weight of a resin binder, 45-65% by weight asbestos and 3-10% by weight of one or more fillers which function to impart increased hardness and wear resistance to the brake shoe or function as friction modifiers. Fillers which are disclosed as imparting increased hardness to the brake shoe include barytes such as $B_aSO4$, alumina ($Al_2O_3$), zinc and limestone ($CaCO_3$). Fillers which function as friction modifiers include brass powder, iron powder, carbon black, ground cork and aldehyde condensation products of cashew nut liquid.

U.S. Pat. No. 3,959,194 teaches composite friction elements which are useful as brake shoes for railroad rolling stock with relatively soft steel wheels. The friction element is composed of 3-25% by weight of a rubber binder, 20-70% by weight of an inorganic filler and 2-12% by weight of a fiber. The fiber component disclosed in the patent is composed of asbestos fibers or a cellulosic fiber such as wood, sisal, jute and rayon fibers. The rubber binder is a natural or synthetic rubber or an elastomeric material which is vulcanized or otherwise cured to form a hard matrix in which the remaining components are distributed. A phenolic resin at a concentration of 1-30% is incorporated in the composition of the friction element as a strengthening or stiffening agent for the rubber matrix. Phenolic resins disclosed in the patent include oil-modified two-stage powdered phenol formaldehyde resins and a liquid resin prepared from natural sources of phenol derivatives derived from aldehyde reacted cashew nut shell oil and containing a curing agent such as hexamethylene tetramine. Among the inorganic fillers disclosed in U.S. Pat. No. 3,959,194 include graphite, cast iron, iron oxide, calcium carbonate, barytes and carbon black.

In forming composite friction elements, the inorganic fillers are added for various purposes. For example, the hard mineral fillers such as iron grit are added for their frictional properties, fillers such as lead oxide are included to modify the frictional effect of the hard mineral fillers; lead powder acts as a lubricant and friction modifier; asbestos fibers as a friction reinforcing agent contributing high physical strength to produce uniformly high friction against ferrous mating surfaces such as railroad car wheels, and withstand high braking temperatures. The rubber resin binds and holds together the mixture of materials.

Asbestos have been generally satisfactory as a reinforcing fiber for use in friction elements, but recent environmental studies have revealed that asbestos may have a detrimental effect on the health of those who are exposed to its presence and, therefore, it is currently desirable to seek alternative compositions in which the asbestos content of brake shoes is reduced or eliminated.

Heretofore, attempts to substitute other fibers for asbestos generally have failed to produce satisfactory friction elements. For example, glass and ceramic fibers fracture in the mixing procedures used to prepare the brake shoe compositions with the result that they contribute poor reinforcement. Furthermore, glass fibers are brittle and tend to break down at the braking interface during service of the brake shoe and high wear rates are thereby encountered. Moreover, the nonporous glass surfaces have a low surface area as compared with asbestos, and the glass fibers do not absorb products of decomposition of the organic components caused by heat which occurs during braking. As a result, when glass fibers are used as the reinforcing material, friction drops precipitously at the temperatures generated during braking. This friction drop due to poor absorption by the reinforcing fibers is known in the brake shoes industry as "fade".

Organic fibers such as cotton, wood pulp and rayon, synthetic fibers composed of such organic polymers as polyacrylonitrile, polyamide, polyester and the like have low surface area and exhibit poor heat resistance. These latter fiber materials lose strength at temperatures in the range of 200°-300° F. and break down in the same manner as the rubber binder. In fact, a small amount of organic fiber is often added to an asbestos reinforced composite friction element to introduce a slight controlled "fade" to save the brake from destruction when the brake is used beyond its rated capacity.

It is the primary object of the present invention to provide an asbestos-free composite friction element suitable for brake shoe application and which is capable of withstanding high temperatures, has high physical strength, provides good braking characteristics particularly applicable to railroad braking, and meets the test standards of the AAR (American Association of Railroads) for brake shoes made with a blend of organic and/or inorganic materials.

SUMMARY OF THE INVENTION

In accordance with the present invention there is provided a composite friction element suitable for the manufacture of high friction composition type railroad brake shoes which are devoid of asbestos and will withstand the braking parameters associated with the deceleration of railroad locomotives, the composite element being comprised of a rubber binder having distributed therethrough a plurality of fillers at least one of which has an oil absorption value of at least 30 and a fiber formed from an aramid polymer.

Brake shoes made from the asbestos-free composite friction materials of the present invention meet the AAR standards for high friction composition type brake shoes.

DESCRIPTION OF THE PREFERRED EMBODIMENTS

The precise composition of the composite friction element of the present invention may be widely varied, but in all instances the element must contain a rubber binder represented at least in part by a vulcanizable rubber or a mixture thereof containing dispersed filler particles having high oil absorption values and aramid polymer fibers which impart wear resistance, afford the desired level of friction coefficient and which reinforce or strengthen the composite element as a whole.

The asbestos-free composite friction element of the present invention has the following representative compositional range in approximate percent by weight:

| | Component | Approximate Percentage Range by Weight |
|---|---|---|
| 1. | Curable rubber binder | 15–30% |
| 2. | Hard Mineral Fillers | 25–50% |
| 3. | Friction Modifiers | 15–30% |
| 4. | Reinforcing aramid fiber | 0.5–10.0% |
| 5. | Absorptive Fillers having an Oil Absorption Value in excess of 30 | 30–50% |

Note, the amount of absorptive fillers may be somewhat reduced and in an amount by weight proximating 25%.

If the above-noted components were measured as a percentage range by volume, the range for each would be much narrower. Because the density of the above components vary so significantly, the percentage range by weight varies accordingly. For example, the percentage range by volume of a filler material such as sand or iron grit would be narrow, but because of the difference in density of these two materials, the iron grit becomes a dominant material when viewed in percentage by weight. The percentage range by weight of the other components are affected accordingly.

The rubber binder used in the practice of the present invention can be any of the rubber binder materials conventionally used by the railroad brake art for the manufacture of brake shoes. Such rubber materials include unvulcanized natural and synthetic rubber or elastomeric materials that can be vulcanized or otherwise cured in situ to form a hard matrix for the remaining components of the composite friction materials of the present invention. Examples of such rubbers are the butyl rubbers, styrene-butadiene copolymer rubbers, acrylonitrile rubbers and chlorinated butyl rubber. These rubbers are vulcanized with the aid of vulcanizing catalysts such as sulfur, 2-mercaptobenzothiazole, tetramethylthiuram disulfide and mixtures thereof which accelerate the rate of cure of the rubber. The vulcanizing catalysts are included in the rubber binder composition in minor amounts, e.g., at concentrations in the range of about 1 to about 3 percent by weight based on the weight of the composite friction element.

Also included in the rubber binder composition are conventional rubber fillers such as carbon black, zinc oxide, lead oxide, lead powder, MgO and ZnO. These fillers are incorporated in the rubber binder at concentrations ranging from about 5 to about 15 percent by weight based on the weight of the composite friction element.

Thermosetting resins such as phenol-aldehyde resins may also be incorporated in the rubber binder composition as a strengthening or stiffening agent for the rubber matrix. The phenolic resin may be a synthetic resin prepared from conventional organic compounds such as phenol and formaldehyde. Alternatively, the phenolic resin may be a resin prepared from natural sources of phenol derivatives such as cashew nut shell oil, which oils are reacted with aldehydes to impart thermosetting properties thereto. Typically, the phenolic resins are incorporated in the rubber binder composition at concentrations in the range of about 1 to about 10 percent by weight based on the weight of the composite friction element. Curing agents such as hexamethylenetetramine are included in the phenolic resin, in relatively small amounts, e.g., about 0.2 to about 1.0 percent by weight based on the weight of the composite friction element to accelerate the cure of the phenolic resin.

Hard mineral fillers incorporated in the brake shoe composition to promote friction in the brake shoes prepared from the composite friction materials of the present invention include iron which may be in the form of iron ore or iron grit, as well as sand, fused silica, and calcined kyanite, i.e. aluminum silicate.

Friction modifiers incorporated into the composite friction material to stabilize the coefficient of friction of the brake shoe under a variety of operating and climatic conditions to which the brake shoe will be exposed so as to provide wear resistance to the shoe may be either organic or inorganic materials such as graphite, partially cured cashew-resin solids, as well as lead and lead compounds such as lead sulfide.

Reinforcing aramid polymer fibers suitable for use in the practice of the present invention as a substitute for asbestos are commercially available from E. I. Du Pont de Nemours under the trade name "KEVLAR". Exemplary of KEVLAR fiber materials suitable for use in the practice of the present invention is KEVLAR 29, a continuous filament yarn having the following physical properties:

TABLE I

| KEVLAR 29 Physical Properties | |
|---|---|
| Density | 0.52 lb/in$^3$ |
| Filament Diameter | 0.00047 in |
| Denier per Filament | 1.5 |
| **Break Elongation | 3% –4% |
| *Tensile Strength | 400,000 psi |
| Tenacity | 22 gpd |
| **Specific Tensile Strength | 8 × 10$^6$ in |
| *Modulus | 9 × 10$^6$ in 480 gpd |
| **Specific Modulus | 2.3 × 10$^8$ in |
| Temperature Resistance | Useful properties from 420° F. to 500° F. (40% decrease in tensile strength at 500° F.) |

*Dry yarn test
**Yarn property divided by density

The term "polymer or aramid polymer" as used in the present specification means a synthetic polymeric resin generally designated in the art as an aromatic polycarbonamide. "Aramid polymer" is disclosed in Technical Disclosure T950,008 (950 OG 6, published Sept. 7, 1976, and, based on an application originally filed Feb. 18, 1975) as being a polymer described in U.S. Pat. Nos. 3,652,510, 3,699,085 and 3,673,143 and is believed to be of a composition hereinafter described. In these patents, the polymers disclosed therein include fiber forming polymers of high molecular weight, e.g. having an inherent viscosity of at least about 0.7, characterized by recurring units of the formula

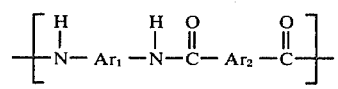

wherein $Ar_1$ is p-phenylene and/or chloro-substituted p-phenylene and/or 4,4'-substituted diphenyl methane, i.e.,

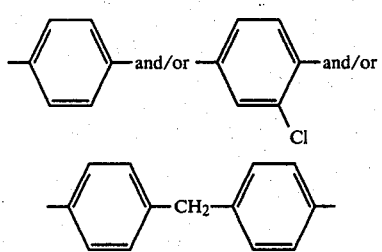

and $Ar_2$ is p-phenylene, i.e.,

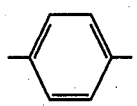

Illustrative examples of polycarbonamides coming within the definition of the above formula are poly (p-phenylene terephthalamide), chloro-substituted poly (p-phenylene terepthalamide), and copolymers thereof.

The designation of the position of location of the substituent groups on the aromatic nuclei of the aramid polymer refers to the location of the substitutents on the aromatic diamine, diacid or other coreactants from which the aramid polymer is prepared.

Although the aramid polymer or aromatic polycarbonamide may consist primarily of carbonamide links (—CONH—) and aromatic ring nuclei, conforming to the formula above, the polymer may contain up to 20 mole percent and preferably 0 to 5 mole percent of non-conforming comonomer units which provide units in the polycarbonamide chain different from

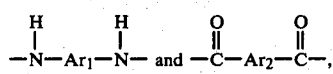

such as aromatic carbonamide units whose chain extending bonds are coaxial or parallel and oppositely directed, e.g.

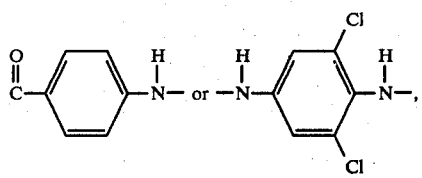

meta-phenylene units, non-aromatic and non-amide groups.

A more comprehensive disclosure of the composition of aramid polymers is found in U.S. Pat. No. 3,673,143 as well as the divisional patent thereof, U.S. Pat. No. 3,817,941, the teachings of which are herein incorporated by reference.

Independent analytical tests and infra-red analysis have indicated that KEVLAR 29 could be predominately (95% weight) poly (p-phenylene diamine terephthalamide) and could be chemically described as poly (p-phenylene diamine terephthalamide)-co-poly (4,4'-diamino diphenyl methane terephthalamide).

It is critical to the practice of the present invention that the reinforcing fibers used in the composite friction element of the present invention be formed from aramid polymers. Thus during braking, railroad brake shoes encounter high quantities of energy in the form of heat generated by the frictional engagement of the brake shoe with the steel wheel of the railroad locomotive so as to raise the interface temperature of the shoe to temperatures in the order of 2000° F. It is believed that due to the relatively high tensile strength and temperature resistance of aramid fibers, e.g. 400,000 psi and 420°–500° F. respectively, the aramid fibers when incorporated in the friction element of the present invention retain their functional properties as reinforcing materials when exposed to the high temperatures encountered in braking.

It is also critical to the practice of the present invention that high absorptive filler materials be used in combination with the reinforcing aramid polymer fiber. Filler materials suitable for this function are organic or inorganic fillers having a high surface area whereby the loss of absorptive capacity resulting from the absence of asbestos is replaced by the high absorptive filler. The term "high absorptive filler" as used in the present specification means a filler material determined to have an Oil Absorption Value of at least 30.

The term "Oil Absorption Value" as used in the present specification means the milliliters of linseed oil required to wet a predetermined volume of the filler, i.e. 100 cubic centimeters (cc) of the filler.

In determining the Oil Absorption Value, a 20 grams portion of the filler powder is placed in shallow ceramic dish and raw linseed oil is metered into the dish from a burette. The linseed oil delivered by the burette is stirred and worked into the powder. The addition of the oil to the powder causes the powder to agglomerate into small balls which increase in size and decrease in number as more oil is metered from the burette into the dish. The addition of the oil is continued until the oil wetted powder coalesces into a single mass or ball of powder. The number of milliliters of oil which cause the coalescence of the powder into an integral, single balled mass is multiplied by 5 to obtain the oil absorption number. The oil absorption number is then multiplied by the specific gravity of the filler, and this latter product is termed the oil absorption value. Listed below in Table II are the oil absorption values of a variety of filler materials useful in the practice of the present invention.

TABLE II

| OIL ABSORPTION VALUE OF FILLERS | |
|---|---|
| Filler | Oil Absorption Value |
| Alumina Trihydrate, type A | 92 |
| Alumina Trihydrate, type B | 102 |
| Alumina Trihydrate, type C | 78 |
| Barite (Barytes, $BaSo_4$) type A | 49 |
| Barite (Barytes, $BaSO_4$) type B | 63 |
| Barite (Glassmakers coarse) | 40 |
| Barite (Glassmakers fine) | 72 |
| Rottenstone (Ground Shale, Penna.) | 86 |
| Anthracite Coal (99.9%–325 mesh) | 72 |
| Magnesium Oxide | 83 |
| Clay, Georgia rubber Grade A | 138 |
| Clay, Georgia rubber Grade B | 140 |

The examples which follow illustrate the practice of the present invention.

EXAMPLES I-V

A series of composite friction elements were prepared in which the amounts of the binder components, filler materials and aramid polymer fiber was varied. The various compositions of the composite friction materials are summarized in Table III below.

TABLE III

| Binder Components | Examples Percent by Weight | | | | |
|---|---|---|---|---|---|
| | I | II | III | IV | V |
| GRS Synthetic Rubber | 6.48 | 6.00 | 6.00 | 6.48 | 6.57 |
| Sulphur | 1.76 | 1.60 | 1.60 | 1.76 | 1.72 |
| Litharge (PbO) | 4.40 | 4.00 | 4.00 | 4.40 | — |
| Cashew Polymer | 2.96 | 2.72 | 2.72 | 2.96 | 2.99 |
| Lead Powder | 1.48 | 1.40 | 1.40 | 1.48 | — |
| Carbon Black | 0.80 | 0.72 | 0.72 | 0.80 | — |
| Hexamethylene Tetramine | 0.40 | 0.36 | 0.36 | 0.40 | 0.37 |
| MgO | 1.96 | 1.80 | 1.80 | 1.96 | — |
| ZnO | — | — | — | — | 5.86 |
| TOTAL BOND | 20.24 | 18.60 | 18.60 | 20.24 | 17.51 |

| Filler Materials | Examples Percent by Weight | | | | |
|---|---|---|---|---|---|
| | I | II | III | IV | V |
| Graphite-fine synthetic | 6.80 | 7.00 | 7.00 | 6.80 | — |
| Galena (PbS) | 10.84 | 11.00 | 11.00 | 10.84 | — |
| Cashew Resin-Solids | 10.92 | 10.00 | 10.00 | 10.80 | 10.26 |
| Calcined Kyanite ($3Al_2O_3$—$2SiO_2$) | 13.64 | 14.00 | 14.00 | 13.64 | 13.70 |
| Calcined Petroleum Coke | 6.04 | 6.40 | 6.40 | 6.04 | 6.18 |
| White Iron Grit | 22.88 | 23.00 | 23.00 | 22.88 | 23.07 |
| Barytes ($BaSO_4$) | 3.76 | 8.20 | 6.40 | 3.76 | 7.47 |
| Fused Aluminum Oxide | — | — | 0.40 | — | — |
| Ferrocene | — | — | — | 0.12 | — |
| Alumina Trihydrate | — | — | — | — | 11.72 |
| Shale-Finely ground | — | — | — | — | 8.30 |
| Fiber Aramid Polymer (KEVLAR 29) | 4.88 | 1.80 | 3.20 | 4.88 | 1.79 |
| | 100.00 | 100.00 | 100.0 | 100.00 | 100.00 |

The GRS rubber used in the examples was a 23% styrenebutadiene emulsion polymer. The "cashew polymer" used was a millable cashew nut shell oil liquid partially polymerized which was cross-linked with hexamethylene tetramine at controlled temperatures. The "cashew resin" was one sold as NC-300 by the Minnesota Mining and Manufacturing Co., this cashew resin is an 80% solution in toluene of a polymerized resin derived from cashew nut shell liquid having a viscosity at 25° C., of 10,000 to 18,000 cps and a gel time in minutes of from 20 to 55 at 83° C. The calcined petroleum coke was National Carbon's W-8300 and the iron grit was Cleveland Metal Abrasive's G-120.

The ingredients of Examples I-V were compounded as follows:

The rubber component, which was in crumb form and the iron grit were soaked with toluene in a sealed container for 24 hours at about 150° F. and thereafter milled in a dispersion blade mixer. All of the remaining components except the aramid polymer fiber were added to the mixture in the container and the batch was mixed in a dispersion blade mixer and worked to a paste. The aramid polymer fiber was then added and the resulting product mixed thoroughly until uniform. This resulting mix was then passed through a hammer mill after which it was dried in an oven maintained at 150° F. so as to effect the complete removal of the toluene contained in the mixture but not to advance the binder materials beyond the flow point.

The resulting mixtures of Examples I-V were cold press formed into a preformed briquette. The briquette was then molded into the shape of a brake shoe in a suitable mold for a period of one hour at 350° F. and a pressure of 2500 pounds per square inch to cure and harden the mixture.

Brake shoes molded from the composite friction materials of Examples I-V were subjected to dynamometer and grade service (drag) tests in accordance with AAR (Association of American Railroads) Test Specification M-926-72.

The dynamometer test subjects 3 randomly selected brake shoes to a sequence of light braking and heavy braking stops from speeds of 10-90 mph in a prescribed sequence. The material lost during the stop tests is determined by weighing the shoes before and after the shoe undergoes the braking sequence. In order for the shoe to be acceptable, the average of the accumulated loss in volume of the 3 shoes must not exceed 1.2 cu. in. per shoe.

Drag tests measure the retarding forces produced by the test shoe which must exceed prescribed minimum requirements, e.g. in the light brake test, the requirement is that with a brake shoe load of 925 lbs. ±25 lbs., the minimum retarding force produced by the shoes must not be less than 300 lbs., and in the heavy brake test (1425 lbs. ±25 lbs. load), the retarding force must not be less than 400 lbs.

The results of these tests are summarized in Table IV below.

TABLE IV

| Composite Friction Material of Example | AAR Dynamometer Test Material lost after prescribed braking sequence completed cu. in./shoe | AAA Drag Test Retarding Force (lbs.) | |
|---|---|---|---|
| | | Light Braking | Heavy Braking |
| 04-15A I | 0.63 | 310 | 370 |
| 05-22A II | 0.46 | 300 | 390 |
| 05-25A III | 0.33 | 300+ | 400+ |
| −24A IV | 0.31 | 300+ | 400+ |
| −25A V | 1.24 | 300+ | 400+ |

It is seen from the foregoing examples that brake shoes made from an asbestos-free composition, but with the inclusion of an aramid polymer fiber and a high absorptive filler have brake test results acceptable for railroad braking service.

For purposes of comparison, the procedure of Examples I-V were repeated with the exception that a fiber product other than an aramid polymer fiber was used in the preparation of the composite friction material.

The compositions of the comparative composite materials designated by the symbol "C" are summarized in Table V below.

TABLE V

| COMPARATIVE FRICTION MATERIALS | | | | |
|---|---|---|---|---|
| | $C_1$ | $C_2$ | $C_3$ | $C_4$ |
| | PERCENT BY WEIGHT | | | |
| Binder Components | | | | |
| GRS Synthetic Rubber | 5.58 | 6.12 | 6.08 | 5.62 |
| Sulphur | 1.67 | 1.84 | 1.65 | 1.53 |
| Litharge (PbO) | 4.19 | 4.59 | 4.13 | 3.81 |
| Cashew Polymer | 2.79 | 3.06 | 2.78 | 2.57 |
| Lead Powder | 1.40 | 1.53 | 1.39 | 1.28 |
| Carbon black | 0.74 | 0.82 | 0.75 | 0.69 |
| Hexamethylene tetramine | 0.37 | 0.41 | 0.38 | 0.35 |

TABLE V-continued

| COMPARATIVE FRICTION MATERIALS | | | | |
|---|---|---|---|---|
| | $C_1$ | $C_2$ | $C_3$ | $C_4$ |
| | PERCENT BY WEIGHT | | | |
| MgO | 1.86 | 2.04 | 1.84 | 1.70 |
| Filler Materials | | | | |
| Graphite | 6.4 | — | 6.38 | 5.89 |
| Galena (PbS) | 10.1 | 11.23 | 10.17 | 9.40 |
| Cashew Resin Solids | 10.3 | 7.84 | 10.24 | 9.47 |
| Iron Grit | 21.5 | 23.69 | — | 19.83 |
| Barytes (BaSO$_4$) | — | — | 14.30 | — |
| Mullite (Aluminum Silicate) | 12.8 | 14.67 | 12.79 | 11.82 |
| Petroleum Coke | 5.6 | 6.15 | 5.67 | 5.24 |
| Full Cured Cashew Nut Shell Liquid | — | 6.57 | — | — |
| Fiber | | | | |
| Wollastonite F-1 | 14.7 | — | — | — |
| Mica | — | 10.06 | — | — |
| Cast Iron Fibers ($\frac{1}{4}'' \times 0.0005''$) | — | — | 21.46 | — |
| Fiberfrax (Aluminum Silicate) short staple fiber | — | — | — | 20.80 |

Brake shoes molded from the composite friction materials of comparative compositions $C_1$–$C_4$ were subjected to the AAR dynamometer and grade service tests in accordance with the same procedures used to evaluate the brake shoes molded from the composite friction materials of Examples I–V. Brake shoes molded from the composite friction material $C_1$ failed the AAR dynamometer test by not passing the 70 mph, 6000 lb. B.S.L. stops.

Brake shoes molded from the $C_2$ composite friction material passed the AAR dynamometer tests but wide fluctuations were encountered in the drag retardation tests and the friction material was of questionable physical strength based on the poor appearance of the shoe after the completion of the tests.

Brake shoes molded from the $C_3$ composite friction material when tested by the AAR dynamometer test failed the drag test and were long on stops.

Brake shoes molded from the $C_4$ composite friction material failed the AAR dynamometer test and had problems of blistering and spalling.

What is claimed is:

1. A brake shoe characterized by a body of a composite friction material having a matrix comprised of a vulcanized rubber binder material having distributed therethrough a plurality of filler particles including hard mineral fillers, friction modifiers and a reinforcing fiber, at least one of the filler particles having an absorptive capacity sufficient to absorb any binder decomposed during braking, the absorptive filler having an oil absorption value of at least 30 and being present in the body at a concentration of about 30 to about 50 percent by weight and the reinforcing fiber being a polymer characterized by recurring units of the formula

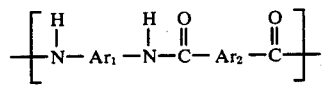

wherein Ar$_1$ is selected from the group consisting of p-phenylene, a chloro-substituted p-phenylene, and 4,4′-substituted diphenyl methane and Ar$_2$ is p-phenylene and the fiber being present in said body at a concentration of about 0.5 to about 10.0 percent by weight.

2. The brake shoe of claim 1 wherein the rubber binder material is a styrene-butadiene copolymer rubber.

3. The brake shoe of claim 1 wherein the rubber binder matrix has incorporated therein a thermosetting resin prepared from phenol and formaldehyde.

4. The brake shoe of claim 1 wherein the binder has incorporated therein a thermosetting resin prepared from an aldehyde reacted cashew nut shell oil.

5. The brake shoe of claim 1 wherein the hard mineral fillers are selected from the group consisting of iron ore, iron grit, sand, fused silica and aluminum silicate.

6. The brake shoe of claim 1 wherein the friction modifiers are selected from the group consisting of graphite, partially cured cashew resin solids, lead and lead sulfide.

7. The brake shoe of claim 1 wherein the absorptive filler is selected from the group consisting of alumina trihydrate, BaSO$_4$, ground shale, anthracite coal, magnesium oxide and clay.

8. The brake shoe of claim 1 wherein the polymer fiber is poly(p-phenylene diamine terephthalamide)-copoly(4,4′-diamino diphenyl methane terephthalamide).

9. The brake shoe of claim 1 wherein the rubber binder is present in the composite friction body at a concentration of about 15 to about 30 percent by weight; the hard mineral fillers are present in the composite friction body at a concentration of about 25 to about 50 percent by weight; and the friction modifiers are present in the composite friction body at a concentration of about 15 to about 30 percent by weight.

10. A brake shoe characterized by a body of a composite friction material having a matrix comprised of a vulcanizable rubber binder material being present in the body at a concentration of about 15 to about 30 percent by weight, the rubber binder material having distributed therethrough a plurality of filler particles including hard mineral fillers, the hard mineral fillers being present in the body at a concentration of about 25 to about 50 percent by weight, and further friction modifiers, the friction modifiers being present in the body at a concentration of about 15 to about 30 percent by weight, at least one of the filler particles having an absorptive capacity sufficient to absorb any binder decomposed during braking, the absorptive filler having an oil absorptive value of at least 30 and being present in the body at a concentration of about 30 to about 50 percent by weight, and a reinforcing fiber formed from a polymer characterized by recurring units of the formula

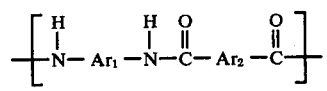

where Ar$_1$ is selected from the group consisting of p-phenylene, a chloro-substituted p-phenylene, and a 4,4′-substituted diphenyl methane and Ar$_2$ is p-phenylene and the fiber being present in the body at a concentration of about 0.5 to about 10.0 percent by weight.

11. In a brake shoe composition including a quantity of friction media, a quantity of a vulcanizable rubber bond material, a quantity of synthetic reinforcing fiber being formed from a polymer characterized by recurring units of the formula

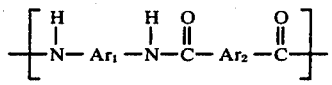

where $Ar_1$ is selected from the group consisting of p-phenylene, a chloro-substituted p-phenylene, and a 4,4'-substituted diphenyl methane and $Ar_2$ is p-phenylene, a quantity of absorptive media, and a quantity of friction modifiers, the improvement therein comprising, said friction media comprising hard mineral fillers, said bond material comprising a vulcanizable rubber, synthetic resin and curing agents to react therewith, said synthetic reinforcing fiber being of a high strength, chemically inert, and high temperature-resistant and having physical characteristics of a tensile strength proximating 400,000 psi, elongation to break proximating 3 to 4 percent, tensile modulus proximating $8.5 \times 10^6$ psi, and density proximating 0.052 lb/in$^3$, and thermal characteristics of decomposition at a temperature proximating 930° F. and a 40 percent decrease in tensile strength of 500° F., said fiber being present in a range by weight of 0.5 to 10.0 percent of the composition and said absorptive media comprising at least one filler having an oil absorption value of at least 30 to absorb any of said bond decomposed during braking, said absorptive media being present in a range by weight of 25 to 50 percent of the composition.

12. A brake shoe composition as defined by claim 11 and further characterized by, said quantity of said synthetic reinforcing fiber being further limited to a percentage range by weight of 1.8 to 4.88 percent.

13. A brake shoe composition as defined by claim 11 and further characterized by, said hard mineral fillers selected from a group consisting of iron grit and calcined kyanite, said bond material rubber being a styrenebutadiene emulsion polymer and said bond material synthetic resin being cashew polymer and said absorptive filler selected from the group consisting of barium sulfate, ground shale rock, alumina trihydrate and magnesium oxide.

14. A brake shoe composition as defined by claim 13 and further characterized by, said hard mineral fillers being in an amount by weight proximating 37 percent, said absorptive filler being in an amount by weight proximating 25 percent.

15. A brake shoe composition as defined by claim 11 and further characterized by, said hard mineral fillers selected from the group consisting of iron grit, iron ore, sand, fused silica and calcined kyanite, said bond material rubber being a styrenebutadiene emulsion polymer and said bond material synthetic resin being cashew polymer, and said absorptive fillers selected from the group consisting of barium sulfate, alumina trihydrate, magnesium oxide, rottenstone, anthracite coal and clay.

16. A brake shoe composition as defined by claim 1 and further characterized by, said hard mineral fillers being in a range by weight of 25 to 50 percent, said bond being in a range by weight of 15 to 30 percent, and said friction modifiers being in a range by weight of 15 to 30 percent.

* * * * *